United States Patent
Murakami

[11] Patent Number: 5,852,639
[45] Date of Patent: Dec. 22, 1998

[54] RESYNCHRONIZATION APPARATUS FOR ERROR CORRECTION CODE DECODER

[75] Inventor: Yasuyuki Murakami, Uji, Japan

[73] Assignee: Murata Kikai Kabushiki Kaisha, Kyoto, Japan

[21] Appl. No.: 544,772

[22] Filed: Oct. 18, 1995

[30] Foreign Application Priority Data

Oct. 28, 1994 [JP] Japan .................................. 6-264323

[51] Int. Cl.$^6$ ...................................................... H04L 7/00
[52] U.S. Cl. ........................ 375/354; 375/365; 375/368; 371/5.1; 371/47.1
[58] Field of Search ................................ 375/354, 368, 375/370, 365; 371/30, 47.1, 5.1, 5.4

[56] References Cited

U.S. PATENT DOCUMENTS

| | | | |
|---|---|---|---|
| 4,466,099 | 8/1984 | Meltzer | 371/47.1 |
| 4,694,455 | 9/1987 | Koga | 371/37.1 |
| 5,140,618 | 8/1992 | Kinoshita et al. | 375/368 |
| 5,581,577 | 12/1996 | Abe | 375/225 |

*Primary Examiner*—Wellington Chin
*Assistant Examiner*—Conguan Tran
*Attorney, Agent, or Firm*—Loeb & Loeb LLP

[57] ABSTRACT

An error correction code is a code of n+1 bits which is obtained by applying a predetermined calculation onto data of n bits and attaching a redundant bit, for example. The error correction code can correct errors generated by itself during transmission. However, when "step out" from n+1 bits interval or asynchronous state occurs, the error correction code becomes unable to correct errors. This invention detects the "step out" of the error correction code using a syndrome, carries out a bit shifting on the data and restores synchronization to the error correction code. When data series are continually transmitted as for facsimile image signals, the resynchronization apparatus of this invention is effective.

5 Claims, 4 Drawing Sheets

RESYNCHRONIZATION APPARATUS FOR ERROR CORRECTION CODE DECODER

BACKGROUND AND SUMMARY OF THE INVENTION

This invention relates to a resynchronization apparatus for an error correction code decoder.

If encoding by an encoder and decoding by an error correction code decoder are not synchronized, decoding becomes impossible.

It is an object of this invention to solve the above problem by detecting an asynchronous state of the decoder and resynchronizing the decoder.

A resynchronization apparatus for an error correction code decoder according to the present invention is characterized by having a bit shift means for carrying out a bit shifting operation on a series of incoming data, a decoding means for receiving an output from the bit shift means, decoding an error correction code and outputting a syndrome, a detecting means that detects a bit "1" generation rate of the syndrome and a control means that causes the bit shift means to carry out the bit shifting operation according to the output of the detecting means. The detection means may include a shift register that receives the syndrome and a weight calculation means that counts the number of the bit "1"s of each stage of the shift register. The control means may cause the bit shifting when the output of the weight count means passes a predetermined value. The error correction code may be an Iwadare code.

Regardless of linear block code or convolution code, the decoder using a syndrome decoding method on the decoding of the error correction code has a feature that if there are no errors, the syndrome value becomes zero. When the synchronization between the decoder and the encoder does not take place, errors are continuously generated. As a result, the syndrome value becomes "1" at a rate of about 50%. This kind of state does not occur if errors are simply generated by channel noise, wave form distortion, jitter etc. Consequently, when this kind of state is detected, out-of-synchronization or "step out" has judged to have been generated. In order to resynchronize, the bit shift means gradually or progressively shifts the synchronization timing. It is judged that resynchronization has been achieved if many of the syndrome values become 0. Then, such a synchronization timing is maintained such that the decoder can perform the decoding appropriately. After that, an output of the decoder becomes available or usable for a following device.

DETAILED DESCRIPTION OF THE PREFERRED EMBODIMENTS

Figure 1:
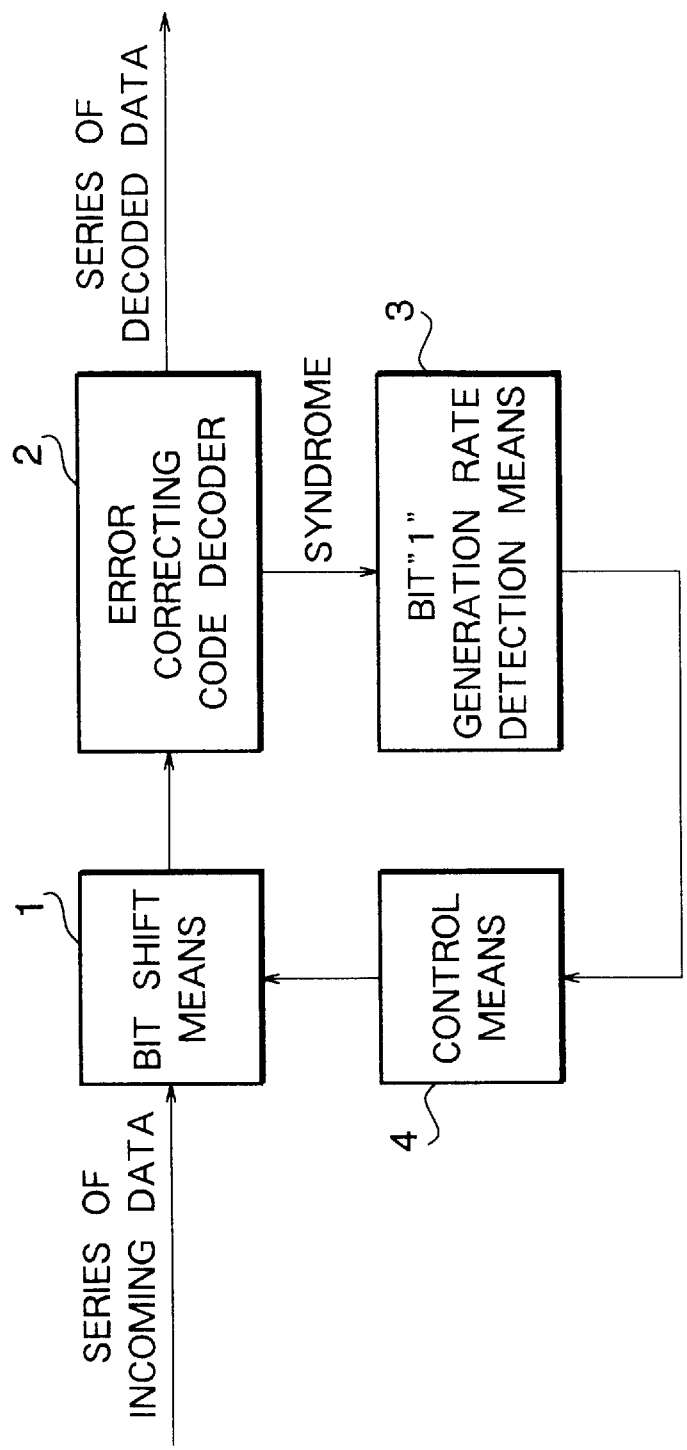
FIG. 1 shows a summarized structure of a resynchronization apparatus for an error correction code decoder of this invention.

Referring to FIG. 1, illustrated is a schematic structure of a resynchronization apparatus for an error correction code decoder of this invention. In the diagram, (1) designates a bit shift means, (2) an error correction code decoder, (3) a bit "1" generation rate detection means and (4) a control means. A series of incoming data is input into the bit shift means (1) and the output of the bit shift means (1) is input into the error correction code decoder (2). The error correction code decoder (2) not only outputs a series of decoded data but outputs a syndrome to the bit "1" generation rate detection means (3). The output of the bit "1" generation rate detection means (3) is introduced into the control means (4). The output of the control means (4) is fed into an input-for-control of the bit shift means (1).

The operation of the schematic structure shown in FIG. 1 will be described. The bit shift means (1) is a means for resynchronizing the error correction code decoder (2). As synchronization with the decoder is lost with data mixing or gaps in a series of data received, appropriate decoding becomes impossible. When the bit "1" generation rate detection means (3) and control means (4) (described later) detect this kind of case, synchronization with the decoder will be recovered by shifting the received series of data. As a result, data received after recovery of synchronization can be correctly decoded.

The bit shift means (1) outputs the received series of data without alternation or with alternation (i.e., shifting of a certain number of bits) depending on the control input from the control means (4). This certain number is not limited to one bit but may be a plurality of bits. Also, the direction of the shift can be in a direction to delay the received series of data or in an advanced direction. Preferably, analyses of the "step out" or non-synchronization conditions are carried out in an actually used apparatus and quicker resynchronization direction of the two will be chosen.

Various types of device can be used as the bit shift means (1). The first example will be described later using FIG. 2: it re-inputs the last input maintained in a succeeding block into the succeeding block itself. Another example has a one bit or multiple bit shift register and chooses whether to output the received series of data unaltered or to output after passing through this shift register (i.e., after bit shifting). If the data series is output unaltered at the time of synchronization, the received series of data is shifted in the delayed direction during the resynchronization operation whereas the received series of data is shifted in the advanced direction in the case where output is performed after passing once through the shift register at the time of synchronization. It should be noted that one bit shift register means one bit latch.

The error correction code decoder (2) runs on a syndrome decode method. Linear block code such as Hamming Code, BCH Code and Reed Solomon Code or convolution code such as Iwadare Code and Hurgerburger Code is used as an error correction code. Furthermore, the word "error correction code" is used as a generic term for error correction code and error detection code. Even in the apparatus using the error detection code, if there is no synchronization with the coder, decoding is impossible.

In case of linear block code, assuming that a codeword series (w) in a check matrix (H) ((w) is a linear code.) is transmitted with a code rate k/n, an error word (e) is added and a series of words (y=w+e) is received, then a n–k dimension vector (s) indicated below:

$$s = (s_1, s_2, \ldots, s_{n-k}) = yH^T$$

is called syndrome. The codeword (w) satisfies $wH^T = 0$ so that $s = (w+e)H^T$ forms $eH^T$. Accordingly, the syndrome (S) is determined by the error word regardless of what the codeword is. If there is no error, the syndrome should become zero.

In case of convolution code, assuming that a codeword series (W) in the check matrix (H) ((W) is a convolution code.) is transmitted with a code rate k/n, an error series E:

$$E=(E_1(D), \ldots, E_n(D))$$

is added and a reception series Y:

$$Y=(Y_1(D), \ldots, Y_n(D))$$

is received (D expresses a delay operator). Then, a n-k dimension vector (S) given by the following equation:

$$S=(S_1(D), \ldots, S_{n-K}(D))=YH^T$$

is called syndrome. The codeword series (W) satisfies $WH^T=0$ so that $S=(W+E)H^T$ becomes $EH^T$. Accordingly, the syndrome (S) is determined by the error series independent of whatever the received data series is. If there is no error, this syndrome always becomes zero.

At the bit "1" generation rate detect means (3), the rate of generation of "1"s in the syndrome from the error correction code decoder (2) is detected. When unsynchronized, a state in which errors are continuously generated is formed in the error correction decoder (2) so that the syndrome value becomes "1" at a rate of 50%. This kind of state is not caused by simple channel noise, wave form distortion and jitter etc. As an example of this generation rate detection means (3), various means can be used. The first example, as will be described later with reference to FIG. 2: it includes a shift register of predetermined length and a means for calculating the total number of "1" outputs from each stage of the shift register. Alternatively, decoding the outputs of each stage of the predetermined length shift register using a logic gate could replace the generation rate detection means (3). Also, the total number of "1"s in the predetermined length syndrome series may be calculated by an output of a counter that up-counts or increments upon "1" appearing at output of a final stage of a predetermined delay means such as a shift register and down-counts upon "1" appearing at an input terminal of this delay means.

The bit "1" generation rate detection means (3) may not only count the number of times of generation of the syndrome output "1" in the predetermined data length, but also refer to a position of the syndrome output "1" in this predetermined data length and output a count after adding a weight corresponding to the generated position.

In the control means (4), the output of the bit "1" generation rate detection means (3) is compared with a predetermined threshold and when it is above the threshold, an output signaling a "step out" state is generated. The threshold is generally set at 50% which is a standard value, but may be varied depending on the type of error correction code adopted and the conditions of error generation. The bit shift means (1) carries out a predetermined bit shifting on the received series of data based on the output of the control means (4). This shifting is continuously or repeatedly carried out at a rate of once per predetermined bit spacing until the control means (4) does not output a "step out" signal. During this shifting, synchronous timing is gradually shifted. When the output showing a "step out" state disappears, the following apparatus is once again able to use the output of the decoder.

In FIG. 1, the bit generation rate detection means (3) and the control means (4) are illustrated as separate elements but both may be combined to a single module or block. For example, this unification may be realized by providing an element that decodes the output from each stage of the predetermined length shift register using a logic gate, which is the previously described one example of the bit "1" generation rate detection means (3), if the logic gate is adapted to directly generate an output "1" as a decode output when a predetermined threshold is passed.

Figure 2:
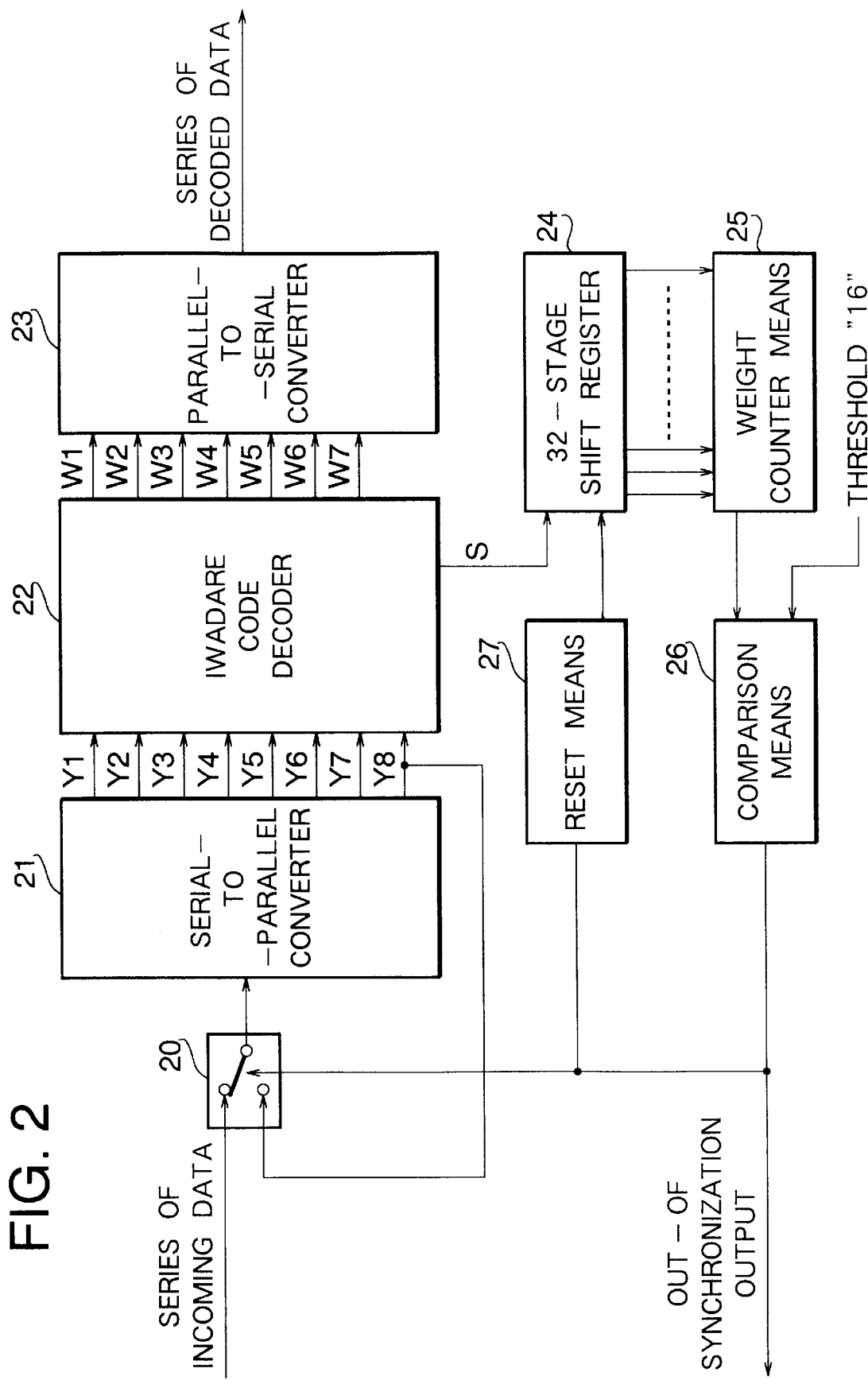
FIG. 2 is a block diagram of the embodiment using Iwadare codes as error correction codes.

FIG. 2 is a block diagram of the embodiment using an Iwadare code as an error correction code. In the diagram, (20) is a bit shift means, (21) is a serial-to-parallel converter means, (22) is an Iwadare code decoder, (23) is a parallel-to-serial converter means, (24) is a 32 stage shift register, (25) is a weight counter means, (26) is a comparison means, (27) is a reset means, (Y1–Y8) are parallel inputs, (S) is a syndrome and (W1–W7) are parallel outputs. A data series is input into the bit shift means (20). The bit shift means (20) is controlled by the later described comparison means (26) and its output is directed to the serial-to-parallel converter means (21). The Iwadare code decoder (22) receives 8 series of parallel inputs (Y1–Y8) from the serial-to-parallel converter means (21) and outputs 7 series of parallel outputs (W1–W7) to the parallel-to-serial converter means (23). The parallel-to-serial converter means (23) outputs the decoded data which has been made to a single series of data. The Iwadare code decoder (22) also outputs one series of syndrome (S). This syndrome (S) is input into the 32 stage shift register and becomes 32 parallel outputs before being input into the weight counter means (25). Based on the output of the weight counter means (25), the comparison means (26) outputs a signal indicating "step out" (or out-of-synchronization) to the control input of the bit shift means (20), the reset means (27) and other related blocks not shown in the diagram. Upon receiving the "step out" signal, the reset means (27) resets the 32 stage shift register (24).

The Iwadare code is well known as one type of convolution code. Elements of the check matrix $H=[H_1(D), \ldots, H_n(D)]$ is given as $D^{di}(1+D^{n-i})$ when $i=1, \ldots, n-1$ and as 1 when $i=n$. Here, $$d_i=3n-2-2i+(n-1-i)(n-2-i)/2$$

The coding rate is (n-1)/n and burst error correction below n bit length is possible. The guard space length which is the shortest error space necessary for correction of errors is:

$$g=3n^2-2n-1+n(n-1)(n-2)/2$$

In this embodiment, n=8 is taken as a specific example. Consequently, the encoding rate is 7/8, burst error correction below 8 bit length is possible and guard space length is 168. The encoder for the Iwadare code is not shown but can be realized using a 42 stage shift register. The decoder will be described later using FIG. 4: it is realized using a seven 42 stage shift register and a syndrome pattern detector.

The syndrome (S) value output from the Iwadare code decoder (22) changes depending on whether there is a synchronous state or not and also on the error generation state. When there is no generation of errors in the synchronous state, the value of syndrome (S) continues as "0". When there is an error of 1 bit in the synchronous state, the value of syndrome (S) becomes "1" in two places and when there is an error of 2 bits in the synchronous state, the value of syndrome (S) becomes "1" in a maximum of four places. In the same way, when there is an error generation of 8 bits in the synchronous state, the value of syndrome (S) becomes "1" in a maximum of sixteen places. In the "step out" state, the value of the syndrome (S) as "1" or "0" appears with roughly equal probability. Consequently, on the precondition that there are few errors generated in the synchronous state, the "step out" state can be detected by the number of outputs of "1" from respective stages of the 32 stage shift register (24). This precondition is fulfilled for normal line conditions.

The syndrome (S) output from the Iwadare code decoder (22) is input into the 32 stage shift register (24). The outputs of respective stages of this 32 stage shift register (24) respectively indicate syndrome (S) values in 32 timing periods. Thus, the bit "1" generation rate for detection length of 32 timings can be detected by knowing the number of "1"s in the outputs from the respective stages. In this embodiment, the number of "1"s in the output from each stage is calculated by the weight counter means (25).

The number of the stages of the 32 stage shift register (24) decides the detection length. Generally 30–100 is suitable as a detection length. The 32 stage shift register (24) may use a shift register circuit as hardware but the same function can be achieved by controlling memory writing and reading using an appropriate program. If the detection length is not above a certain length, it is impossible to obtain a precise generation rate. However, if the detection length is big and the shift register is realized in hardware, the circuit structure becomes also big, and if the detection length is big and the program is adopted, the memory capacity or processing stage number becomes also big. Consequently, the detection length will be determined by an actually used communication line and a requested efficiency margin.

In the weight calculation means (25), instead of simply calculating the number of output "1" values of each stage of the 32 stage shift register (24), the number of output "1" values may be counted after weighted according to a window function of, for example, Hamming window. In short, the "1" outputs from stages in the central area of the shift register are multiplied by a larger weight whereas the "1" outputs from stages in end areas of the shift register are multiplied by a smaller weight. If the output is multiplied by a weight acquired by the window function as described above, the 32 stage shift register (24) and the weight calculation means (25) may be united to a 32 stage FIR filter.

In the comparison means (26), the output of the weight counter means (25) is compared with the threshold value "16" and when it exceeds this threshold value "16", a signal indicating "step out" is output. This threshold value is suitably around 50% of the detection length. If it exceeds 50%, the "step out" may become undetectable or detection may take too much time. Conversely, if it is below 50%, the probability of a simple error being judged as "step out" becomes high. In consideration of this, the threshold value is preferably around "13" to "16".

Hysteresis may be brought about in the comparison means (26). For example, when the output of the weight counter means (25) exceeds the threshold value "16", a signal indicating "step out" may be output and after that when it falls below the threshold value "13", a signal indicating "step out" may be no longer output. In this way, unstable resynchronization operation is prevented.

When the reset means (27) receives an input signal indicating "step out" from the comparison means (26), it resets the 32 stage shift register (24). As will be described later, there are 42 stages or 42 transfer timings until the received data series which has been delayed by 1 bit is reflected in the syndrome output (S) of the Iwadare code decoder (22). Accordingly, as with the 32 stage shift register (24) having stages less than 42, it is not absolutely necessary to reset. However, when the number of the stages of the shift register (24) is for example 100, it is necessary to reset.

It should be noted that the functions of the weight counter means (25) may be realized in another specific means: for example, by inputting the output of each stage of the 32 stage shift register (24) into logic gates and decoding it. In this case, decoding may be done with weight attachment.

Further, the weight counter means (25) and comparison means (26) may be united in a single block by arranging logic gates in a manner such that an output "1" is generated as a decode output when the predetermined threshold value is exceeded. It should also be noted that all or part of the functions of the whole blocks shown in FIG. 2 may be realized as software with appropriate memories and programs.

Figure 3A:
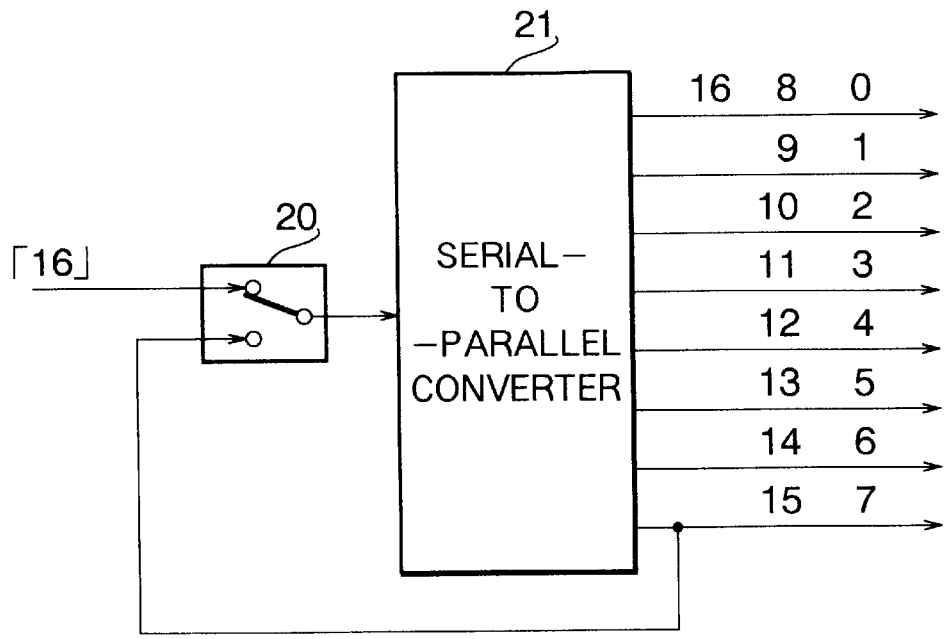
FIG. 3(A) and FIG. 3(B) illustrate resynchronization operations of the embodiment shown in FIG. 2, respectively.
Figure 3B:
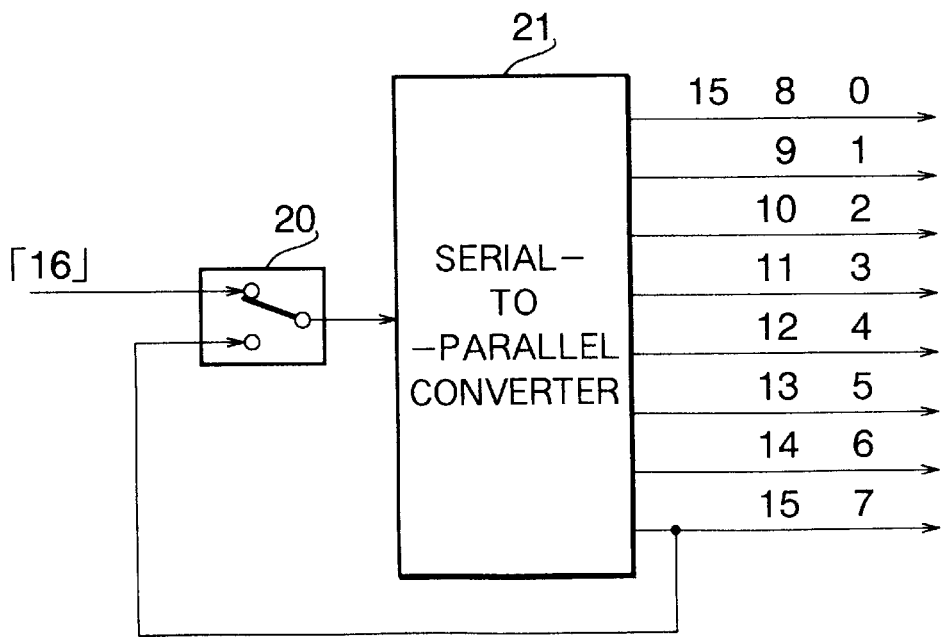

FIGS. 3(A) and 3(B) depict the resynchronization operation performed in the embodiment shown in FIG. 2. FIG. 3(A) shows the normal state and FIG. 3(B) shows the state when the resynchronization process is in effect. The reference numerals (20) and (21) are already used in FIG. 2 and designate the same items. Referring to FIG. 3(A), the bit shift means (20) outputs the received series of data as it is to the serial-to-parallel converter (21). Consequently, the serial-to-parallel converter (21) outputs from the 0th bit to 7th bit of the received data series to the following Iwadare code encoder (22) as one group (Y1–Y8) and repeats similar operations. FIG. 3(A) illustrates the point in time when the 16th bit is being entered.

In FIG. 3(B), the bit shift means (20) outputs the received data series as it is to the serial-to-parallel converter (21) until the 15th bit. At this point, assuming that the state of the bit shift means (20) is switched. The 15th and last bit which is temporarily maintained in the serial-to-parallel converter (21) is entered in the serial-to-parallel converter (21). Afterwards, due to the bit shift means (20) returning to its original state, the received data series after the 15th bit is output as it is to the serial-to-parallel converter (21). Then, the serial-to-parallel converter (21) outputs from the 15th bit to 22nd bit to the following Iwadare code encoder (22) as one group (Y1–Y8). As a result, the received data series enters into the Iwadare code decoder (22) with delay by one bit. In the case where there should be delay by two bits, for example, the 14th and 15th bits which are temporarily maintained in the serial-to-parallel converter (21) are reentered in the serial-to-parallel converter (21), and then the received data series after the 15th is output as it is to the serial-to-parallel converter (21).

The Iwadare code decoder (22) outputs the syndrome (S) at the time of transfer, i.e., when the serial-to-parallel converter (21) outputs the group of bits (Y1–Y8) to the Iwadare code decoder (22). Corresponding to this, if a signal indicating "step out" is output from the comparison means (26), the bit shift means (20) delays the received data series by one bit. As described later, there are 42 stages×8 bits or 42 times of transfer or 336 bits until the received data series which has been delayed by 1 bit is completely reflected in the syndrome output (S) of the Iwadare code decoder (22). Also, when the shift register (24) is long (for example, when it has 100 stages), 100 times of transfer are necessary after the resetting for the resynchronization operation until the syndrome (S) fulfills every stage of the shift register. Consequently, if a signal indicating "step out" is output even after 100 transfer operations (larger times of transfer among the above-mentioned two), the bit shift means (20) delays the reception series by one bit again. This action is repeated until the a signal indicative of "step out" is no longer output. By further delaying the timing for causing the second 1 bit delay in the received data series, so-called backward protection for synchronization can be achieved. It should be noted that when a signal indicating "step out" is output, the Iwadare code decoder (22) may output an incomplete syndrome (S') (FIG. 4; will be described later), which is obtained from a register relatively near the input, into the 32 stage shift register (24), whereby a return to synchronization or recovery of synchronization is quickly detectable. It should also be noted that a short length burst error only is reflected in this incomplete syndrome (S').

Figure 4:
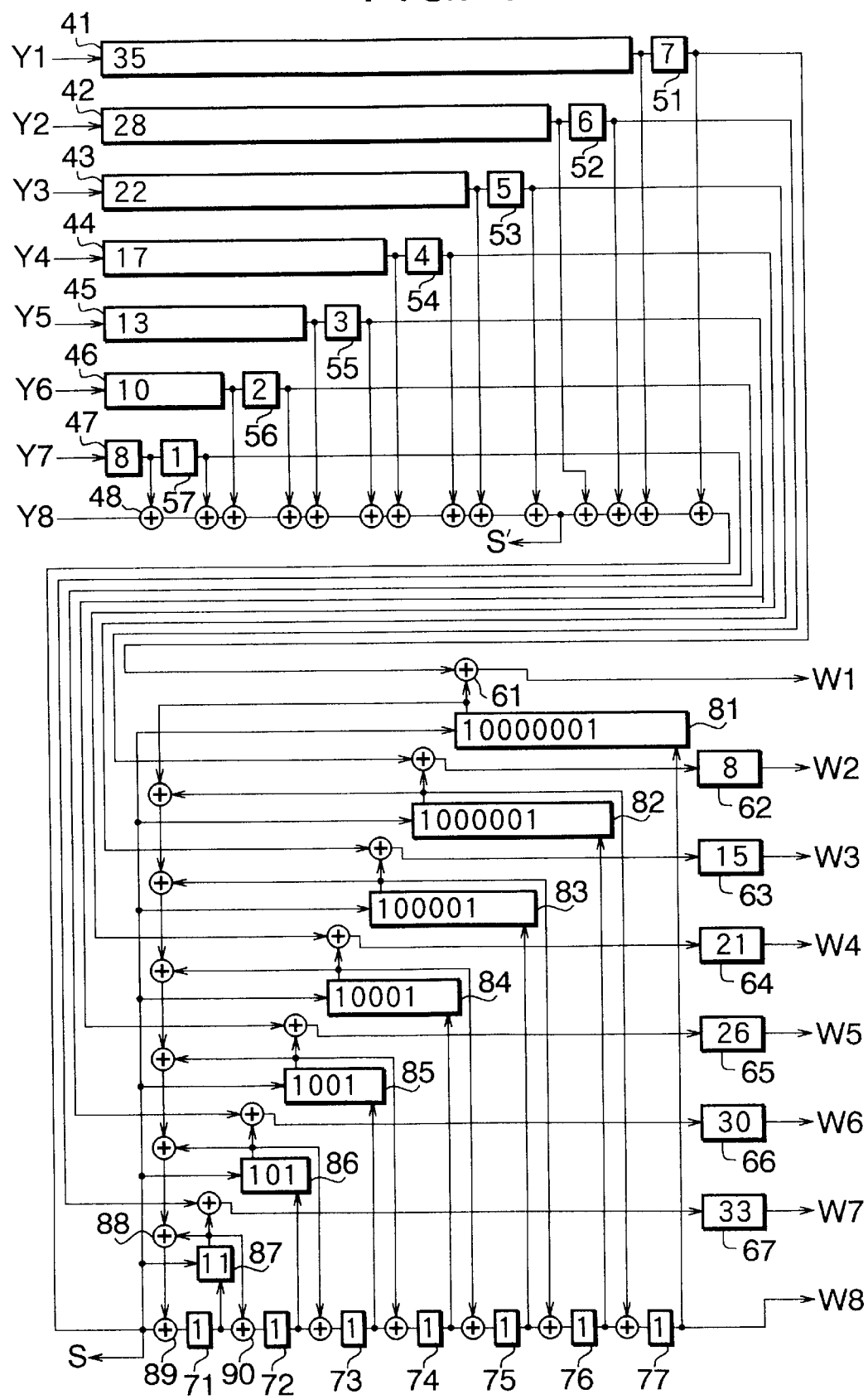
FIG. 4 is a circuit diagram of an Iwadare code decoder.

FIG. 4 is a circuit diagram of the decoder for the Iwadare code. In the diagram, reference numeral (41) denotes a 35 stage shift register, (42) a 28 stage shift register, (43) a 22 stage shift register, (44) a 17 stage shift register, (45) a 13 stage shift register, (46) a 10 stage sift register, (47) a 8 stage shift register, (48) calulators (adders), (51) a 7 stage shift register, (52) a 6 stage shift register, (53) a 5 stage shift register, (54) a 4 stage shift register, (55) a 3 stage sift register, (56) a 2 stage shift register, (57) a 1 stage shift register, (61) calculators (adders), (62) a 8 stage shift register, (63) a 15 stage shift register, (64) a 21 stage shift register, (65) a 26 stage shift register, (66) a 30 stage shift register, (67) a 33 stage shift register, (71), (72), (73), (74), (75), (76) and (77) 1 stage shift registers, (81) a "10000001" pattern detector, (82) a "1000001" pattern detector, (83) a "100001" pattern detector, (84) a "10001" pattern detector, (85) a "1001" pattern detector, (86) a "101" pattern detector, (87) a "11" pattern detector, (88), (89) and (90) are adders, (Y1) to (Y8) parallel inputs, (S) a syndrome, (W1) to (W8) parallel outputs and (S') an incomplete syndrome. For ease of illustration regarding the adders 48, 61, 88 and 90, only one of each group of adders is assigned a reference numeral and application of numbers to other adders is omitted. For instance, there are fourteen adders (48) in the arrangement shown in FIG. 4, but only the leftmost one has the reference numeral (48). Likewise, seven adders (61) are positioned diagonally but only the rightmost or top one has the reference numeral and six adders (88) are vertically arranged but only the bottom one has a reference numeral. It should be rioted that the number in a box representing a shift register indicates the number of the stages of the shift register and the number in a box representing a pattern detector shows the pattern to be detected. It should also be noted that a 1-bit shift register means 1-bit latch.

A group of parallel inputs (Y1–Y8) from the serial to parallel conversion means (21) is input into the 35 stage shift register (41) to 8 stage shift register (47) and the adder (48) respectively. The outputs of the shift registers (41–47) are input into the 7 stage shift register (51) to the 1 stage shift register (57) respectively.

The outputs of the 8 stage shift register (47), 1 stage shift register (57), 10 stage shift register (46), 2 stage shift register (56), 13 stage shift register (45), 3 stage shift register (55), 17 stage shift register (44), 4 stage shift register (54), 22 stage shift register (43), 5 stage shift register (53), 28 stage shift register (42), 6 stage shift register (52), 35 stage shift register (41) and the 7 stage shift register (51) are respectively added to the input (Y8), a resultant from the leftmost adder (48), that from the second leftmost adder (48), that from the third leftmost adder (48), that from the fourth leftmost adder (48), that from the fifth leftmost adder (48), that from the sixth leftmost adder (48), that from the seventh leftmost adder (48), that from the eighth leftmost adder (48), that from the ninth leftmost adder (48), that from the tenth leftmost adder (48), that from the eleventh leftmost adder (48), that from the twelfth leftmost adder (48), that from the thirteenth leftmost adder (48) and that from the fourteenth leftmost or rightmost adder (48) by the adders (48), and the syndrome (S) is output.

The output of the 7 stage shift register (51) is corrected by the adder (61) when there is an error, and (W1) is output. In the same way, the outputs from the 6 stage shift register (52) to the 1 stage shift register (57) are corrected by the associated adders respectively when there is an error, and corrected ones are output to from the 8 stage shift register (62) to the 33 stage shift register (67) respectively. The outputs from the 8 stage shift register (62) to the 33 stage shift register (67) become (W2–W7) respectively. Among parallel outputs (W1–W8), the outputs (W1–W7) are output to the parallel to series conversion means (23). The syndrome (S) is shifted through the 1 stage shift registers (71, 72, 73, 74, 75, 76, 77) having adders (88, 89, 90) on their input side respectively and becomes an output (W8). It should be noted that this output (W8) is not used in the following block.

The "10000001" pattern detector (81) to the "11" pattern detector (87) are bit pattern detectors that detect errors in the inputs (Y1–Y7) among the group of parallel inputs (Y1–Y8) respectively. The "11" pattern detector (87) receives the syndrome (S) and the output of the 1 stage shift register (71) and outputs "1" when both the former and the latter are "1". This output is fed to one of the adders (61) (leftmost one near the adder (88) in FIG. 4). The error in the output from the shift register (57) derived from the input (Y7) is corrected by this adder and the resultant is output to the 33 stage shift register (67) whereby the error corrected data (W7) is output. At the same time, the input of the 1 stage shift register (71) is made "0" by the adder (89) on the input side of the 1 stage shift register (71) via the adder (88) and the input of the 1 stage shift register (72) is also made "0" by the calculator (90) on the input side of the 1 stage shift register (72). By doing this, the "11" series of the syndrome is changed to "00".

In a similar way, the "101" pattern detector (86) receives the syndrome (S) and the output of the 1 stage shift register (72), detects when the syndrome (S) is "1" and the output of the 1 stage shift register is "1", and outputs "1". Originally, detection of when the output of the 1 stage shift register (71) was "0" was also necessary. However, if the output of the 1 stage shift register (71) is "1", it is not necessary since correction is already carried out in the preceding error correction conducted by the "11" pattern detector (87). With this output, the data series (Y6) is error corrected and output to the 30 stage shift register (66), and the error corrected output (W6) results therefrom. At the same time, the syndrome series "101" is changed to "000".

In a similar manner, when an error is detected by a detector from the "1001" pattern detector (85) to the "10000001" pattern detector (81), each series of inputs (Y5–Y1) is error corrected by the associated adder (61), and outputs (W5–W1) are available via from the 26 stage shift register (65) to the 8 stage shift register (62) and the adder (61) respectively. It should be noted that in this circuit since the following circuit does not use the output (W8), errors concerned with the input (Y8) are not corrected.

The syndrome (S) is taken out or available immediately after the output of the 7 stage shift register (51) derived from the input (Y1) has been added to the data derived from the input (Y8) in the rightmost adder (48). Consequently, it takes 42 stages×8 bits or 42 times of transfer or 336 bits until the parallel inputs (Y1–Y7) are completely reflected in the syndrome (S). As described previously, in order to enable quick detection of recovery of synchronization, the syndrome (S) may not be utilized for synchronization detection: instead, the incomplete syndrome (S') may be taken out immediately after addition of the output of the 5 stage shift register (53) derived from the input (Y3) to the data derived from the input (Y8) in the fifth rightmost adder (48), and it is input into the 32 stage shift register (24) upon detection of the asynchronous state. Alternatively, by always inputting the incomplete syndrome (S') to the 32 stage shift register (24), the "step out" may also be detected quickly.

As evident from the above description, when digital data transmission is carried out using an error correction code by the synchronization error detection apparatus of this invention, generation of the "step out" state between the terminals can be detected. Further, when digital data transmission is carried out using an error correction code by the resynchronization apparatus of this invention, synchronization is recovered and the error correction operation can be returned to normal.

What is claimed is:

1. A resynchronization apparatus for an error correction code decoder comprising:

bit shift means for bit shifting a series of incoming data;

decoding means for receiving an output of the bit shift means, decoding an error correction code and outputting a syndrome;

detection means for detecting a bit generation rate of the syndrome; and control means for making the bit shift means bit shift based on the output of the detection means, wherein the detection means includes a shift register that enters the syndrome and weight count means for counting "1" bit in each stage of the shift register, and the control means causes the bit shifting by the bit shift means when an output of the weight count means reaches above a predetermined value.

2. The resynchronization apparatus of claim 1, wherein the control means includes comparison means for comparing the output of the weight count means with the predetermined value.

3. The resynchronization apparatus of claim 1 or 2, further including means for resting contents of the shift register when the control means causes the bit shifting.

4. The resynchronization apparatus of claim 1 or 2, wherein the error correction code is an Iwadare code.

5. The resynchronization apparatus of claim 3, wherein the error correction code is an Iwadare code.

* * * * *